W. STUBBLEBINE,

Assignor of one-half interest to B. C. LAUTH.

Puddling and Heating Furnace.

No. 9,140. Reissued April 6, 1880.

Witnesses:

Henry Howson Jr.

Harry Smith

Inventor:

William Stubblebine, by his Attorneys,

Howson and Son

THE NORRIS PETERS CO., PHOTO-LITHO., WASHINGTON, D. C.

UNITED STATES PATENT OFFICE.

WILLIAM STUBBLEBINE, OF BETHLEHEM, ASSIGNOR OF ONE-HALF INTEREST TO BERNARD C. LAUTH, OF PHILADELPHIA, PENNSYLVANIA.

PUDDLING AND HEATING FURNACE.

SPECIFICATION forming part of Reissued Letters Patent No. 9,140, dated April 6, 1880.

Original No. 223,962, dated January 27, 1880. Application for reissue filed February 2, 1880.

*To all whom it may concern:*

Be it known that I, WILLIAM STUBBLEBINE, of Bethlehem, Northampton county, Pennsylvania, have invented a new and useful Improvement in Heating and Puddling Furnaces, of which the following is a specification.

The object of my invention is to insure the thorough combustion of the gases evolved from the fuel in the fire-chambers of puddling or heating furnaces and the maintenance of a uniform and high degree of heat in the same; and this object I attain by combining with a furnace an air and gas chamber located above the fire-chamber, and having direct communication therewith through openings in the roof of the said fire-chamber, the said gas and air chamber being provided with a valved blast-pipe, all as explained hereinafter.

Figure 1:
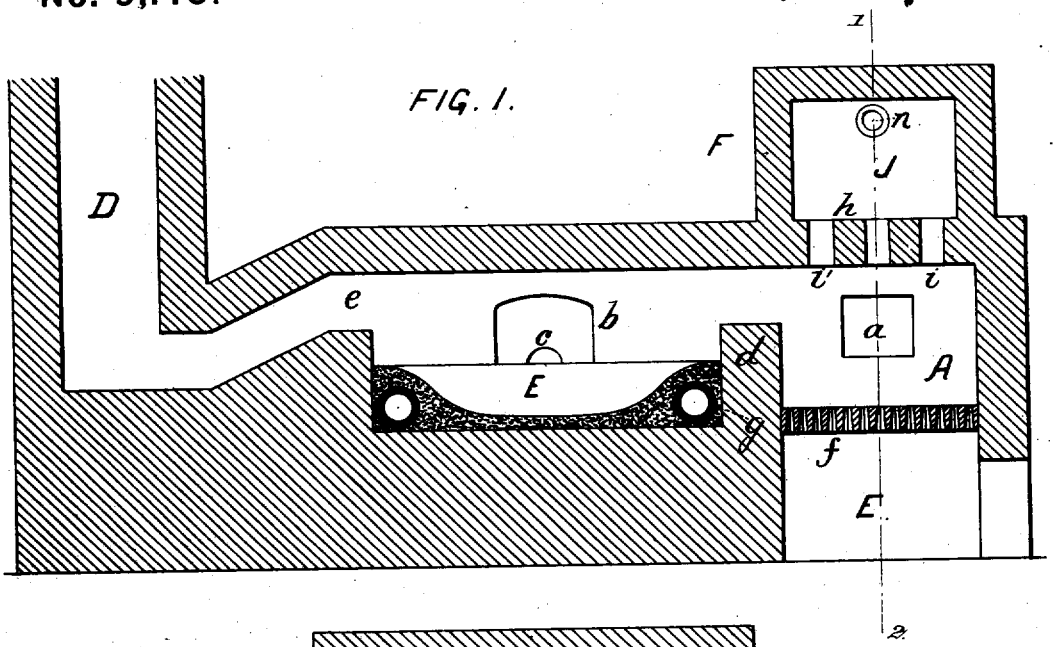
Figure 2:
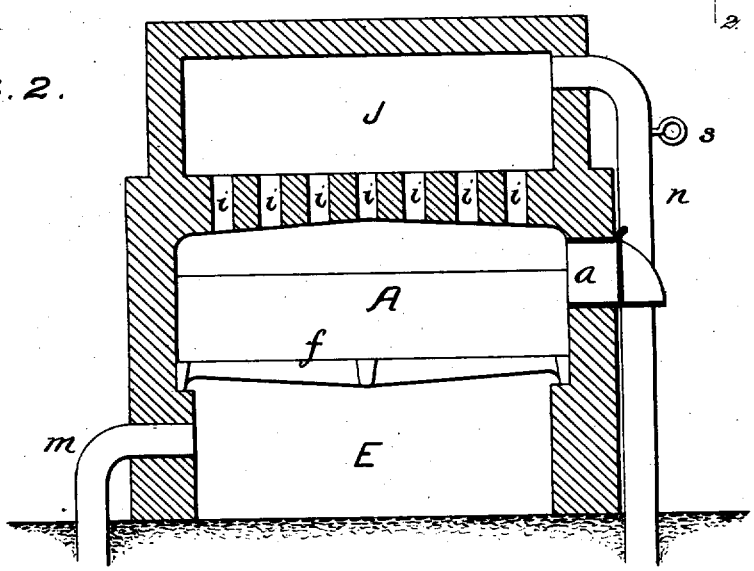

In the accompanying drawings, Figure 1 is a longitudinal section of a puddling-furnace constructed for carrying out the invention, and Fig. 2 a transverse section on the line 1 2, Fig. 1.

So far as the furnace proper is concerned it is similar to ordinary puddling-furnaces, A being the fire-chamber; B, the puddling-chamber; D, the chimney; E, the ash-pit; *a*, the feed-opening for the fuel; *b*, the working-opening; *d*, the bridge-wall; *f*, the grate; *e*, the flue leading to the chimney, which is provided at the top with the usual damper, and *g* the tubular chills surrounding the puddling-bed. The openings *a* and *b* and the opening to the ash-pit are provided with the usual doors, that of the opening *b* having a working-hole, *c*. On the roof *h* of the fire-chamber, and immediately above the latter, is built a structure, F, inclosing a chamber, J, which communicates with the interior of the said fire-chamber through openings *i i'* in the roof *h*.

The usual blast-pipe *m* communicates with the ash-pit E of the furnace, and a blast-pipe, *n*, serves to introduce air into the chamber J, the flow of air through said pipe *n* being regulated by means of a valve or damper, *s*.

In working my improved furnace I introduce a very light blast into the ash-pit E instead of the usual heavy blast, the fuel being introduced into the fire-chamber A in small quantities and at frequent intervals.

On introducing each supply of fuel into the fire-chamber the valve of the blast-pipe *n* is opened, and, owing to the draft over the bridge-wall, the blast has a tendency to seek the rear openings, *i'*. In the meantime the gases evolved from the fuel and accompanied with more or less flame of a character indicating imperfect combustion will enter the chamber J through the front openings, *i*, and the gases will be intimately mixed with the air in the said chamber, the mixture passing through the rear openings, *i'*, into the fire-chamber near the bridge-wall, and being there consumed so as to add to the heat of the furnace.

It has been found in practice that the invention results in the maintenance of a high degree of heat in the puddling-chamber of the furnace, the saving of fuel, the working of more heats than usual in a given time, and the production of puddled iron of a quality superior to that made in ordinary furnaces from the same kind of pig-iron.

The intervals between the charges of fuel introduced into the fire-chamber, the quantity of fuel introduced at each charge, and the regulation of the blast will depend in a great measure upon the condition of the metal in the puddling-chamber.

It may be stated, however, that the blast into the chamber J may be diminished by closing or partly closing the valve of the blast-pipe *n* after the volatile gases evolved from one charge of fuel have been consumed, that the valve should be opened when a new charge is introduced, and that the blast below the grate may be increased as the upper blast is decreased.

I wish it to be understood that I do not desire to claim, broadly, an air-chamber provided with an air pipe or pipes, and situated above the fire-chamber of a puddling or heating furnace, and communicating therewith through openings in the roof of said fire-chamber, for the purpose of directing air into the products of combustion; but

I claim as my invention—

The combination, with a puddling or heating furnace, of a gas and air chamber, J, located above the fire-chamber, having a direct communication therewith through openings *i i'*, and having a valved blast-pipe, *n*, all substantially as described.

In witness whereof I have hereunto set my hand in the presence of two subscribing witnesses.

WILLIAM STUBBLEBINE.

Witnesses:
JAMES TOBIN,
HARRY SMITH.